Sept. 17, 1968   J. HAIMSON ET AL   3,402,357
HIGH ENERGY CHARGED PARTICLE PULSE LENGTH
AND ENERGY CONTROL APPARATUS
Filed Sept. 28, 1964   2 Sheets-Sheet 1
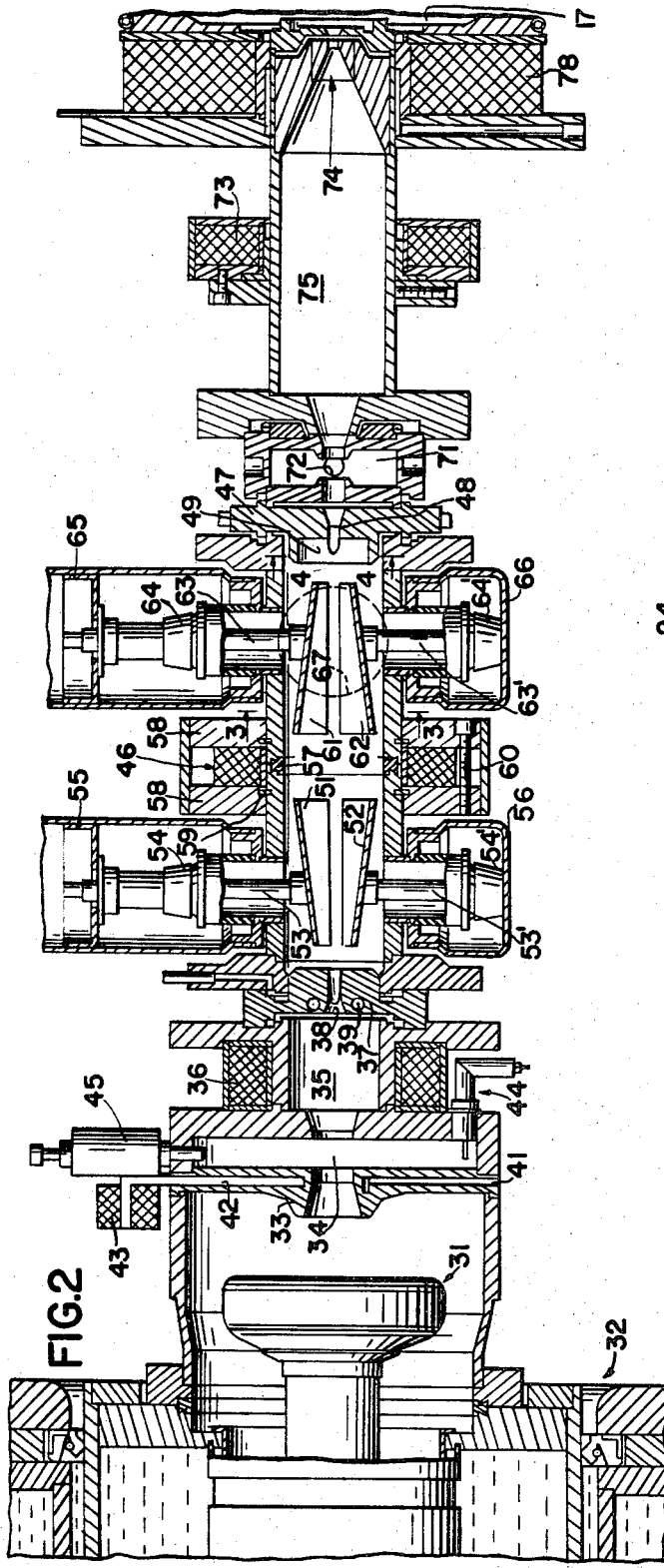
INVENTORS
JACOB HAIMSON
CRAIG S. NUNAN
BY *Wm J Nolan*
ATTORNEY Sept. 17, 1968  J. HAIMSON ET AL  3,402,357
HIGH ENERGY CHARGED PARTICLE PULSE LENGTH
AND ENERGY CONTROL APPARATUS
Filed Sept. 28, 1964  2 Sheets-Sheet 2

INVENTORS
JACOB HAIMSON
CRAIG S. NUNAN
BY
ATTORNEY

United States Patent Office
3,402,357
Patented Sept. 17, 1968

3,402,357
HIGH ENERGY CHARGED PARTICLE PULSE LENGTH AND ENERGY CONTROL APPARATUS
Jacob Haimson, East Palo Alto, and Craig S. Nunan, Los Altos Hills, Calif., assignors to Varian Associates, Palo Alto, Calif., a corporation of California
Filed Sept. 28, 1964, Ser. No. 399,492
14 Claims. (Cl. 328—229)

ABSTRACT OF THE DISCLOSURE

Controlled variations in pulse length and pulses of uniformly energetic charged particles are "chopped out" of a cathode pulse in a system utilizing two pair of thyratron controlled deflection plates, a magnetic field orthogonal to the second pair of plates downstream from the first pair and a high energy dissipating V-slotted apertured beam collector. Selected portions of a cathode pulse are "chopped out" by controlled discharge of thyratrons connected to one of each pair of positively charged deflection plates. Discharge of the upstream thyratron permits the beam to pass undeflected through the aperture. Discharge of the downstream thyratron permits the magnetic field to deflect the beam into the high energy dissipating V-slotted beam collector. By such apparatus, uniformly energetic pulses of charged particles of lengths down to a fraction of a nanosecond, e.g., 1/32 nanosecond, have been obtained.

---

The present invention relates in general to apparatus for pulsing a particle beam and more particularly to apparatus for pulsing a particle beam to produce pulses continuously variable in length down to extremely short pulse lengths.

In a variety of different applications it becomes desirable to produce a beam pulse of charged particles with the time duration or length of the pulse variable down to minute fractions of a second. Such pulse beams are useful for devices utilizing charged particles and in which extremely tight energy spread of charged particles is desired such as, for example, in a high energy linear accelerator in which high energy electrons of substantially uniform energy are required. Structures of this nature are useful for sophisticated nuclear experiments and particle scattering experiments.

The object of the present invention is to provide a particle beam pulsing apparatus for producing pulses of charged particles having a pulse length continuously variable down to a minute fraction of a second such as, for example, a nanosecond or a fraction of a nanosecond.

Broadly stated the present invention, to be described in greater detail below, includes the provision of a deflecting assembly in the beam path of charged particles generated in a particle source and in which the deflecting assembly includes a first and a second pair of deflecting plates positioned in succession along the particle path for either directing the particle beam onto a succeeding collecting electrode or permitting passage of the beam through a collimating aperture in the collecting electrode for passage into a particle utilizing device. Potential is applied to the pairs of deflecting plates for establishing a field at the first pair to deflect the particle beam onto the collecting electrode, which field can be rapidly removed to permit a portion of the particles in each pulse of the pulsed beam to pass through the collimating aperture in the collecting electrode. Additionally means are provided for establishing a field between the second pair of electrodes which permits passage of the particle beam therepast and undeflected thereby and means for changing the potential of at least one of the second pair of plates to change the field therebetween for deflecting particles from a position in which they pass through the collimating aperture to a position where they strike the collecting electrode and are collected thereon.

With the present invention it is possible to permit the whole or any selected portion of a pulse of charged particles from a particle source which may have a pulse duration of any length to pass in the particle utilizing device. A particular advantage is that the selected portion of the pulse may be during the middle of the pulse when all particles in the pulse have substantially the same energy whereby a pulse of charged particles having substantially uniform energy can be passed into the particle utilizing device.

In accordance with one aspect of the present invention the deflecting fields produced by the deflecting plates are achieved by applying a positive voltage to one of the first pair of plates and grounding the other of that pair of plates whereby a charged particle beam passing through the field between the pair of plates is deflected from its normal particle path and collected on the collecting electrode without passing through the collimating apparatus. The second pair of plates normally during initial operation of the device has the same potential such as a positive potential applied to each of the deflecting plates so as not to affect the path of the particle beam and means are provided for discharging one of the plates to ground to change the field between the second pair of plates for deflecting the particles passing therebetween from the particle path which permits passage through the collimating aperture to a position for interception on the collecting electrode. This construction permits rapid switching or deflection of the charged particle beam first into and through the collimating aperture and then out of the collimating aperture and onto the collecting electrode to achieve an extremely short pulse of particles passing through the aperture.

One advantage of the present invention lies in the fact that extremely short pulses can be produced such as on the order of nanoseconds or fractions thereof, so that when a pulse of particles with such a short pulse length is directed through an accelerating structure which has a microwave energy fill time long with respect to this pulse length the microwave energy stored in the accelerating structure during the fill time can be transferred to the beam and time compressed for producing high peak pulse powers in an output circuit.

In the preferred embodiment of the present invention, when no deflection by the second pair of deflection plates is desired one of such plates is charged to positive potential and the other plate is carried at ground potential, and a magnetic field is provided in the region between the plates which counterbalances the effect on the charged particles of the plate electric fields whereby discharging of the positively charged plate to ground effects a deflection of the particle beam passing between the second pair of plates.

This preferred construction of the deflecting assembly in accordance with the present invention increases the number of deflecting plates maintained at ground potential thereby to avoid the problems inherent in maintaining a constant positive potential on the plate when there is a likelihood of interception of charged particles on the plate from the particle beam.

In accordance with still another aspect of the present invention a cavity resonator for chopping the amount of particle beam passed therethrough is utilized in combination with the deflecting assembly and includes a cavity resonator positioned along the charged particle beam path and arranged for passage of the particle beam therethrough and dimensioned to resonate in a primary mode having oscillating magnetic fields directed transversely on the particle beam path passing therethrough for deflecting the particle beam through a position for passage of charged particles into the particle pulse utilizing apparatus during only a portion of the operating cycle of the magnetic field within the cavity resonator.

The preferred cavity resonator construction in accordance with this aspect of the present invention is a rectangular cavity operating in the $TE_{102}$ mode or a circular cavity resonator operating in the $TM_{110}$ mode. This construction produces an oscillating magnetic field across a beam path through the center of the cavity for deflecting the particles passed therethrough into and out of a collimating aperture in the cavity wall without the necessity for shielding the pulse of charged particles from other deflecting fields. By way of example in the prior art chopping cavity such as described in U.S. Patent 2,993,142 and operating in the $TE_{010}$ mode, it is necessary to shield the particles deflected by an electric field from a magnetic field which produces an equal and opposite deflecting force to that produced by the desired electric fields.

An additional feature and advantage of the present invention is the provision of a prebunching cavity and clipping collimator positioned downstream of the deflecting assembly, the cavity dimensioned to pass and velocity modulate a pulse of particles that has been deflected by a chopping cavity and a deflection assembly and the clipping collimator positioned downstream of the prebunching cavity and serving to permit passage of only a portion of the pulse of particles. This construction avoids beam induced fields in the prebunching cavity by a pulse of charged particles that has been clipped before passage therethrough.

Still another feature and advantage of the present invention is the provision of a collecting electrode having a collimating aperture therethrough and an energy distributing slot, V-shaped in cross-section, extending across the collector to the collimating aperture. With this construction a pulse of charged particles focused into the slot is collected on the sides of the slot for distributed heat dissipation through a substantial thickness of the collecting plate, thereby to prevent the pulse of particles from being focused onto a small area where it can burn a hole through the collecting plate.

These and other features and advantages of the present invention will be more apparent upon a perusal of the following specification taken in connection with the accompanying drawings wherein:

FIG. 1 is a schematic view partially broken away of a linear accelerator incorporating features of the present invention;

FIG. 2 is an enlarged elevational sectional view of a portion of the structure schematically illustrated in FIG. 1;

FIGS. 8A–8C are graphs of current versus time for particles in certain portions of a machine employing the present invention.

Figure 4:
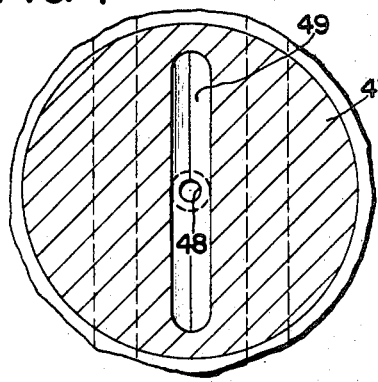
FIG. 4 is an enlarged sectional view of a portion of a structure shown in FIG. 2 taken along line 4—4 in the direction of the arrows.

The present invention is directed primarily to a pulsing apparatus which can be utilized in a particle accelerator such as, for example, an electron linear accelerator. While the invention will be described hereinafter with particular reference to an electron linear accelerator it can be utilized with other pulse particle utilizing apparatus such as, for example, position accelerating structures.

Referring now to the drawings, with particular reference to FIG. 1, there is schematically illustrated a particle accelerator 10 which includes an elongated vacuum envelope 11 with a beam generating assembly 12 for generating and directing a particle beam 13 longitudinally of the envelope 11. A beam deflecting and injecting assembly 14 is disposed along the envelope 11 between the beam generating assembly 12 and a particle accelerating wave guide 15 which is provided at its output end with an output window 16 through which a pulse of electrons which have been accelerated to relativistic velocities can be passed for performing sophisticated nuclear experiments or for direction onto a target electrode for generating other radiation such as, for example, X-rays.

The accelerating wave guide 15 includes a plurality of wave beam interaction structures 17, 18 and 19 such as, for example, apertured disc-loaded wave guide for transferring energy from radio frequency electromagnetic waves to charged particles such as, for example, electrons passing therethrough for accelerating the electrons to relativistic velocities. The accelerating wave guide 15 is energized by a high power RF source such as, for example, a dual output klystron tube in which the microwave energy from one of the outputs is fed into section 17 for transmission therethrough, through a phase shifter 22 and through section 18 for interaction with a pulse of charged particles directed therethrough from the beam generating assembly 12. The accelerating sections 17, 18 and 19 are fluid-cooled such as, for example, by water for absorption of the heat dissipated in the waveguide by the RF power, and residual RF power remaining at the end of section 18 can be coupled to a load 23. RF energy from the other output of the klystron 21 is coupled through a phase shifter 24 into the accelerating section 19 in proper phase relation with respect to the partially accelerated pulse of charged particles to continue accelerating the particles until they reach the end of the accelerating section 19 and are passed through the window 16 or into other apparatus for utilization. Residual RF power at the output end of accelerating section 19 can be passed into an external load 25. The fluid-cooling assembly for the third accelerating section 19 is provided with a heater 20 for changing the temperature of the cooling fluid, thereby to decouple the section 19 from the particle beam.

The beam generating assembly 12 and the beam deflecting and injection assembly 14 are constructed for producing pulses of charged particles having a pulse length continuously variable down to a minute fraction of a second.

Referring now to FIG. 2 which illustrates an enlarged view of assemblies 12 and 14, the beam generating assembly 12 includes a cathode and focus electrode assembly 31 which is mounted at the one end of the envelope 11 and which during operation is positioned in an electrical insulating oil bath 32. Spaced along the axis of the particle accelerator 10 from the cathode and focus electrode assembly 31 is an apertured anode 33 which is followed by a beam chopping cavity resonator 34 which will be described in greater detail below with reference to FIG. 5.

A drift space 35 is positioned along the beam path following the cavity resonator 34 and is surrounded by a magnetic lens 36 for focusing the particle beam 13 onto a collector 37 or through a collimating aperture 38 in the collector 37 for passing short pulses of charged particles through the collimating aperture 38 into the beam deflecting and injection assembly 14. The collector 37 and the anode 33 are provided with water-cooling channels 39 and 41 respectively for passing cooling fluid through these respective electrodes to cool the electrodes which are heated due to interception of the charged particles.

A plurality of separate beam steering probes are provided around the aperture in the anode 33 and include a steering rod 42 of magnetic material which projects radially outwardly of the anode 33 with its exterior end surrounded by a coil 43 for changing the magnetic field established at the interior ends of the steering rods 42.

A coupling loop 44 is provided for coupling RF energy into the cavity resonator 34 which can be tuned to the desired operating electromagnetic mode by means of the tuner schematically illustrated at 45.

The beam deflection assembly 14 spaced axially down the envelope 11 from the collector 37 includes a focusing lens 46 such as, for example, a thin magnetic lens coil for focusing the diverging pulsed electron beam 13 onto a subsequently positioned collecting electrode 47 or through an axially aligned collimating aperture 48 in the collector 47. A first pair of deflection plates 51 and 52 is located on opposite sides of the beam path between the collector 37 and the lens 46 for deflecting the pulsed electron beam 13 from a position in which the beam impinges on the collector 47 to a position for passage through the collimating aperture 48. The collector 47 is provided with an energy distributing slot 49 (see FIG. 4), V-shaped in cross-section, extending across the collector on opposite sides of the collimating aperture 48 for collecting the beam focused thereinto over a large surface area. The pulse of charged particles is swept longitudinally of the slot 49 during operation of the deflecting assembly as described in detail below. The collector 37 is provided with a similar energy distributing slot along which the pulse of charged particles is swept by the fields in the beam chopping cavity resonator 34.

Each of the deflection plates 51 and 52 is semi-cylindrical in form tapering outwardly in the direction of beam travel and is supported on one end of a conducting rod 53, the other end of which is supported in a vacuum seal assembly 54 located in the envelope 11. The conducting rod 53 which supports the deflection plate 51 is connected to a thyratron 55 which is coaxially supported with respect to the vacuum seal 54. The conducting rod 53' which supports the deflection plate 52 is connected to ground via a metallic cup-shaped member 56 which surrounds the vacuum seal 54' and is electrically connected to the body of the metallic envelope 11.

A second pair of deflection plates 61 and 62 is located between the lens 46 and the collector 47 for deflecting the electron beam from the position in which it passes through the collimating aperture 48 to a position for impingement on the collector 47. These plates 61 and 62 are shaped similarly to plates 51 and 52 but tapered inwardly toward the axis in the direction from the lens 46 to the collector 47. Plate 61 is connected via connecting support rod 63, through a vacuum seal 64 to a coaxially mounted thyraton 65 while plate 62 is connected via support rod 63', through vacuum seal 64' and via a metallic cup-shaped member 66 to the envelope 11 and ground. The second pair of deflection plates 61 and 62 is rotated (not shown) about the envelope 11 axis with respect to the pair of plates 51 and 52 to allow for rotation imparted to the beam in passing through the lens 46, and this rotation is accomplished by a rotatable vacuum joint in the envelope at the lens 46. This vacuum joint includes a metal gasket vacuum seal 57 which is held together by a pair of rotatable flanges 58 rotatably secured on the envelope 11 on opposite sides of the magnetic lens 46 by retaining rings 59 and held together by a plurality of bolts 60.

Figure 3:
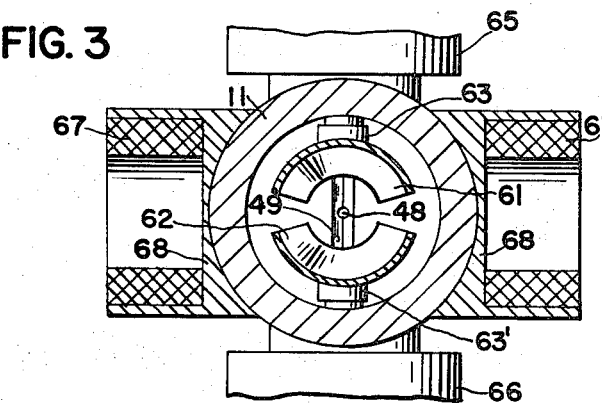
FIG. 3 is a sectional view of a portion of the structure shown in FIG. 2 taken along line 3—3 in the direction of the arrows.

A magnetic bias field is produced in the region between the second pair of plates 61 and 62 by a pair of electric coils 67 provided with end pole pieces 68 located against the exterior of the envelope 11 midway between the deflection plates 61 and 62 as shown in greater detail in FIG. 3. The magnetic bias field produced by the coils 68 counterbalances the electric field between plates 61 and 62 so that for operation of the deflection assembly as described in greater detail below plate 62 can be grounded, thereby avoiding problems of voltage variation on plate 62 and consequent variation in electric field strength between the plates due to interception of charged particles on plate 62.

The electric field between each pair of deflection plates can be separately controlled as will be described in greater detail below for deflecting the electron beam between the position off the axis of the envelope 11 for collection on collector 47 to a position on the axis of the envelope 11 for passage through the collimating aperture 48. In this manner an easily adjusted short pulse of electrons can be passed through the collimater 48 into a prebuncher cavity 71 in which RF fields are established such as, for example, by an RF signal introduced thereinto via an input coupling loop 72. The bunched short pulse of charged particles emanating from the prebunching cavity 71 is focused to a small diameter by means of, for example, a thin magnetic lens coil 73 and directed into the input end of the first accelerator section 17 through a collimating aperture 74. The focusing coil 73 is axially slidable along the length of a drift space 75 between the prebunching cavity 71 and the collimating aperture 74 for producing an optimum focus of the pulse of charged particles into the accelerating structure.

Figure 5:
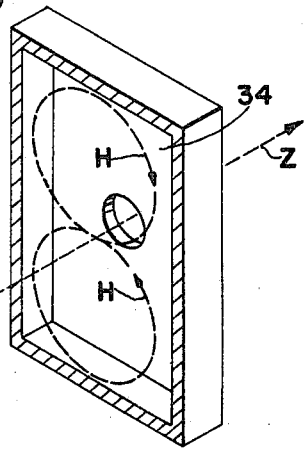
FIG. 5 is an enlarged perspective view partially in section schematically illustrating a main chopping cavity in accordance with the present invention.
Figure 7:
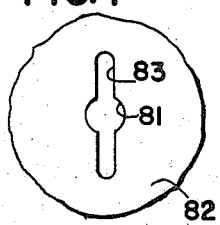
FIG. 7 is a sectional view of a portion of the structure shown in FIG. 6 taken along line 7—7 in the direction of the arrows.

Referring now to FIG. 5, the chopping cavity 34 has oscillating magnetic fields across the beam path through the center of the cavity and this region of the cavity is free from counterbalancing deflecting electric fields. As shown, the cavity resonator 34 is a rectangular cavity operating in the $TE_{102}$ mode. The electric fields associated with the deflecting magnetic fields illustrated in FIG 5 are threaded through the magnetic fields and rather than existing at the center of the cavity where the beam path lies are distributed such as to provide a peak field between the beam hole and the cavity end walls. Alternatively, the cavity resonator can be a circular resonator operating in the $TM_{110}$ mode for producing the same particle deflection effects as the rectangular cavity described above. Here again in the circular $TM_{110}$ cavity resonator the oscillating magnetic fields arranged transverse to the cavity axis in the pattern as shown in FIG. 5 for a rectangular cavity are concentrated on the beam axis of the accelerator with the electric fields concentrated remote therefrom. With the particle beam directed through the cavity resonator centrally thereof, the particle beam is subjected to deflecting magnetic fields without being subjected to compensating or counterbalancing deflecting electric fields.

Chopping cavities operating in higher order modes such as, for example, rectangular $TE_{10n}$ and circular $TM_{1mo}$, where $n$ and $m$ are integers and $n \geq 2$ can be utilized so long as the relationship of beam path to the magnetic and electric fields is similar as for the primary modes described above.

Figure 8A:
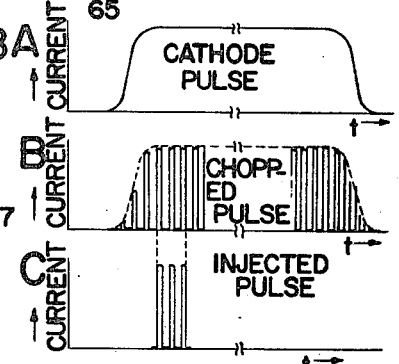

Operation of the method and apparatus in accordance with the present invention will be described with a typical operating example. A pulsed electron beam is produced in the beam generating assembly 12 having a pulse duration of apporoximately several microseconds, a rise time on the order of tenths of microseconds, and a peak beam current on the order of approximately 4 amps, such as illustrated schematically in FIG. 8A. The beam steering coils are properly adjusted to focus the beam pulse into the V-shaped groove in the collector 37 and biased to one side of the collimating aperture 38 so that during deflection in the chopper cavity and at any one end of the chopper deflection pattern the particle pulse is directed through the collimating aperture 38 for transmission into the deflection assembly 14, i.e., only one burst of particles per RF cycle. When the beam pulse is not biased to one side of the collimating aperture two particle bursts are transmitted per cycle and, for example, when injected into a linear accelerator only one burst will be accepted; the other (displaced 180° in phase) will be automatically rejected by the reversed high electric field in the accelerator. An RF signal such as, for example of S-band frequency is fed into the chopper cavity to sweep the pulsed particle beam across the collector 37 so that only a portion of the particle pulse is passed through the collimating aperture 38 into the deflecting assembly each cycle of the oscillating electromagnetic fields within the chopper cavity 34, as illustrated schematically in FIG 8B. The duration of the cycle in the chopping cavity is, for this example, about ⅓ nanosecond, and the duration of each individual burst of particles passed from the chopping cavity into the deflection assembly depends upon the ratio of beam diameter to collimator aperture and the magnitude of scan in the chopper cavity. By passing charged particles into the deflecting assembly during only about 10% of the chopper cycle it should be possible to obtain bursts with a duration of about ⅓₀ nanoseconds. The deflection plates can be used with gas thyratons or hard tubes. In the latter case higher repetition rates and rise times can be obtained.

In the deflector, assembly 14 of the deflection plate 52 is grounded and deflection plate 51 is held at a potential of approximately 10 kv. Similarly, the deflection plate 62 is grounded and deflection plate 61 is held at a positive potential of approximately 10 kv. The particle deflection in the region of the second pair of plates 61 and 62 due to the electric field between the plates is counterbalanced by the magnetic field supplied by the coils 67. The positively charged deflection plates 51 and 61 are connected to the thyratrons 55 and 65 which may be independently triggered to provide pulse length control. During the initial portion of the pulse, deflection plates 51 and 61 are positively charged such that the diverging beam pulse passing between the first pair of plates 51 and 61 is radially deflected from the axis of the deflection assembly, passes through the field of the focusing lens 46 where some image rotation is produced, and is focused in the slot 49 at the collector 47 radially displaced from the axially located collimating aperture 48. No deflection action is experienced by the converging beam in passing through the second pair of plates 61 and 62 because of the biased field condition.

When the first deflector plate 51 is rapidly discharged by triggering its driver thyratron 55, the beam suddenly becomes symmetrically located about the center line of the deflection system causing the focal point to sweep along slot 49 in the collector 47 into the collimating aperture 48 and provide injection into the prebuncher cavity 71 and subsequently into the accelerating structure. After a suitable controllable time delay, deflector 61 is discharged by its thyratron 65 and the DC magnetic bias field remaining in the region between the second pair of plates causes the beam to be deflected away from the collimating aperture 48 and swept onto the collector surface 47. One or more chopped and bunched particle bursts may be passed into the accelerating structure using this unique deflection assembly.

A number of advantages flow from this structure. The major advantage lies in the capability of continuous and smooth variations of pulse lengths from maximum cathode pulse lengths down to fractions of a nanosecond. Additionally, not only can very short pulses be produced but also they can be produced any time during the initial cathode pulse. For example, by selecting a portion at the middle of the pulse it is possible to avoid low current bursts such as occur during the rise and fall times of the pulse. This also permits selection of substantially constant energy particles for insertion into particle accelerators that can only accelerate particles over an extremely tight energy spread as required in sophisticated nuclear experiments.

Figure 6:
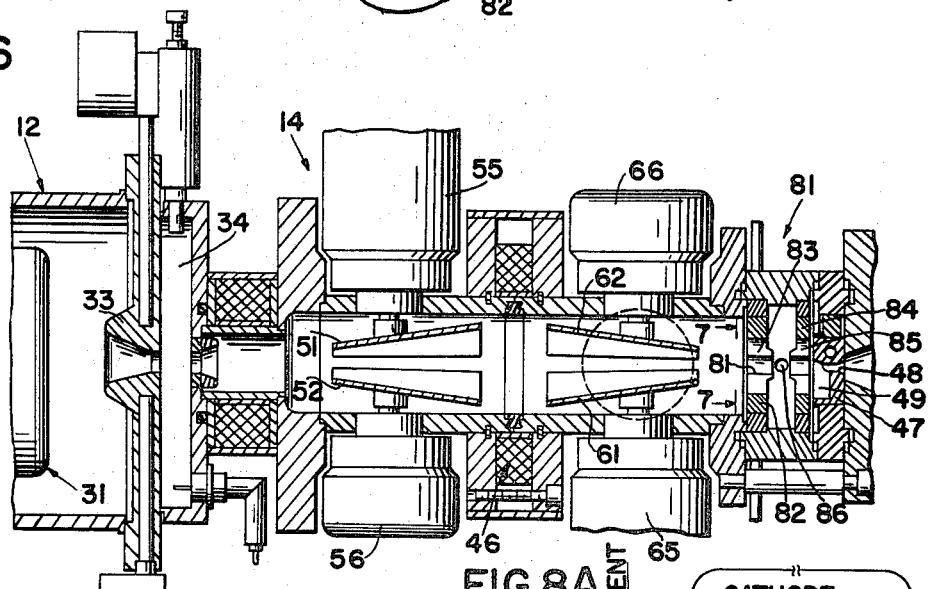
FIG. 6 is a sectional view of an alternative structure in accordance with the present invention.

While the invention has been described above with reference to positioning of the chopping cavity upstream of the prebunching cavity this construction requires proper phasing between the signals as applied to the separate cavities and control of the induced fields in the prebuncher cavity due to the chopped beam passing therethrough. Referring now to FIG. 6, there is shown a structure wherein this beam-induced field is avoided. As shown, a pulse of charged particles is generated in the beam generating assembly 12 and passed through a chopping cavity 34 directly into the beam deflection and injection assembly 14 without clipping of the pulse on a collector. In the deflection assembly 14 the successive pairs of plates 51–52 and 61–62 are utilized to sweep the pulse of particles across the collector 47 downstream thereof for passage of the portion of the pulse through the collimating aperture 48. In this arrangement the positions of the plates 61 and 62 are reversed so that instead of moving across the collimating aperture from one side to the other the pulse is moved into the aperture from one side and then moved back out of the aperture on the same side. The prebunching cavity 81 is positioned between the second pair of plates 61 and 62 and the collector 47. This cavity 81 which is preferably a circular $TM_{010}$ mode cavity is provided with an input disc wall 82 having an elongate slot 83 aligned with the deflection path of the charging particle pulse and an output disc wall 84 having a similarly oriented slot 85.

In the operation of the device shown in FIG. 6 the chopper deflected pulse of particles introduced into the cavity 81 is swept across the collector 47 by operation of the deflection plates in a manner similar to that described above with reference to FIGS 1–5 to pass a portion of the pulse through the collimating aperture during each cycle of the chopper cavity. After passage of the particles through cavity 81 the pulse is bunched due to the influence of an RF signal coupled thereinto by a coupling member 86. The end result is a beam path which positions the beam for passage through the collimating aperture 48 during a portion of the cathode pulse as shown in FIG 8C. Only one collector is utilized and induced fields in the prebunching cavity due to only clipped portions of the beam passing therethrough are avoided.

Naturally many modifications can be made in the construction of the present invention without departing therefrom. For example, the counterbalancing magnetic field produced by the coils 67 can be omitted and both plates 61 and 62 maintained at the same positive potential until the end of the desired pulse length at which time one of the plates is discharged to ground. While the slot 49 in the collector 47 in the structure of FIGS. 1–5 is designed for sweeping the particle beam forwardly into the collimating aperture 48 and again forwardly out of the collimating aperture 48, it is obvious that the potentials on the deflecting plates can be selected for deflecting the particle beam forward into the collimating aperture 48 and then rearwardly out of the collimating aperture 48. Additionally, the chopping cavity can be placed downstream of the prebunching cavity; in this case velocity modulation of the beam through the chopping cavity will result in an RF deflection pattern correspondingly modified, and this effect may be used to enhance the selection of varied electrons for a tighter phase spread of resultant prebunched beams.

While the chopping cavity having a transverse magnetic field arranged across its center path has been described primarily for passage of only a portion of the particle beam therethrough, an arrangement of a pair of such cavities would also provide an extremely accurate beam position signal. For example, when located on the beam center line of a linear accelerator two rectangular $TE_{102}$ cavities connected together and oriented at right angles can be adjusted to indicate in which quadrant the beam charge "center of gravity" lies. Similarly such a device with each cavity energized at the fundamental RF frequency but 90° out of electrical phase can deflect a beam passing therethrough to produce a circular scan at the RF cyclic frequency. Such a device can act as a bunch length monitor as a bunched beam of the same frequency made to pass through this device will produce only an arc of a circle such that the arc length divided by the full circumference and multiplied by 360° gives the actual bunch length.

Since many changes can be made in the above construction and many apparently widely different embodiments of the invention can be made without departing from the scope thereof it is intended that all matter contained in the above description or shown in the accompanying drawings shall be interpreted as illustrative and not in a limiting sense.

What is claimed is:

1. A particle beam pulsing apparatus including:
 a source of charged particles;
 a collector electrode having an aperture for passage of charged particles into a particle utilizing device;
 means for drawing a beam of charged particles from said source and aiming said particle beam along a path toward the aperture in said collecting electrode;
 a first pair of deflection plates disposed between said source and said collecting electrode, the plates of said first pair disposed on opposite sides of said particle path from said source to said collecting electrode;
 a second pair of deflection plates disposed between said first pair of plates and said collector electrode, the plates of said second pair disposed on opposite sides of said particle path;
 means for producing a first static potential difference between the plates of said first pair of plates to deflect the particles away from said path to cause said particles to strike said collector on one side of the aperture in said collector;
 means for rapidly reducing said first static potential difference between the plates of said first pair of plates to a second static potential difference to cause said particles to follow said particle path and pass through the aperture in said collector; and
 means for changing the static field between said second pair of deflection plates for deflecting particles from a position in which they pass through the aperture in said collecting electrode to a position where they strike said collecting electrode.

2. A particle beam pulsing apparatus including:
 a source of pulses of charged particles;
 a collector electrode having an aperture for passage of charged particles into a particle utilizing device;
 means for drawing a beam of charged particles from said source and aiming said particle beam along a path toward the aperture in said collecting electrode;
 a first pair of deflection plates disposed between said source and said collecting electrode, the plates of said first pair disposed on opposite sides of said particle path from said source to said collecting electrode aperture;
 a second pair of deflection plates disposed between said first pair of plates and said collector electrode, the plates of said second pair disposed on opposite sides of said particle path;
 means connecting one of said first pair of deflection plates to ground potential;
 means for charging the other of said first pair of deflection plates to a positive potential for establishing a deflecting field between said plates for deflecting the initial particles of each pulse away from said particle path to a position on said collector electrode on one side of the aperture in said collector electrode;
 means connected in circuit with said other of said first pair of deflection plates for discharging the potential applied thereto to ground to remove the field between said plates for permitting a portion of the particles in said beam to pass through the aperture in said collecting electrode into said particle-utilizing device;
 means for providing a static field between the plates of said second pair of plates for establishing a field that permits undeflected passage of the particle beam therepast; and
 means connected in circuit with one of the plates of said second pair of plates for changing the potential on said one deflecting plate to change the field between said second pair of plates for deflecting particles from a position in which they pass through the aperture in said collecting electrode to a position where they strike said collector electrode on a side of the collector aperture.

3. The pulsing apparatus of claim 2 characterized further in that said means providing potential to the plates of said second pair of plates includes means for charging each of said second pair of plates to a positive potential, and said means connected in circuit with one of said second pair of plates includes means for rapidly reducing the potential on said one of said second pair of plates.

4. The pulsing apparatus of claim 2 characterized further in that said means providing potential to the plates of said second pair of plates includes means connecting one of said second pair of plates to ground and means for charging the other of said second pair of plates to a positive potential, means for establishing a magnetic field in the region between said second pair of plates counterbalancing the effect on the charged particles by the electric field between the positive and the grounded plates and said means connected in circuit with one of said second pair of plates includes means for rapidly reducing the potential on said positive plate to ground.

5. In a particle accelerator for accelerating particles to high energies;
 a source of charged particles;
 an anode electrode spaced from said source and having an aperture therethrough;
 means for drawing a pulsed beam of charged particles from said source and focusing said pulsed beam through the aperture in said anode electrode;
 accelerating tube means for accelerating charged particles and having an input end for receiving particles;
 a collector electrode positioned at the input end of said accelerating tube means and between said accelerating tube means and said anode, said collector electrode having an aperture therein for passage of charged particles therethrough into said accelerating tube means; and
 a deflecting assembly for deflecting each pulse of said pulsed beam for passage of only a portion of said pulsed beam through said collecting electrode into said accelerating tube including
  a lens positioned between said anode electrode and said collecting electrode for focusing said pulsed beam to a small diameter at said collecting electrode,
  initial deflecting means including first and second deflection plates disposed between said first collecting electrode and said lens, said first and second deflection plates diverging in a direction toward said lens and located on opposite sides of the particle path from the aperture in said anode electrode to the aperture in said collecting electrode,
  means for providing potential to said first and second deflection plates for establishing a deflecting field between said plates for deflecting the initial particles of each pulse away from said particle path to a position on said collector electrode on one side of the aperture in said collector electrode,
  means connected in circuit with one of said first or second deflection plates for changing the potential on said one deflection plate to change the field between said plates for permitting a portion of the particles in each pulse of said pulsed beam to pass through the aperture in said collecting electrode into said accelerating tube means, final deflection means for deflecting particles up to the end of each pulse from said particle path to a position on said collecting electrode, said final deflecting means including third and fourth deflection plates diverging from the aperture in said collecting electrode toward said lens, located on opposite sides of said particle path, and rotated through an angle with respect to said first and second deflection plates equal to the angle of rotation imparted to the pulsed beam by said lens, means for providing potential to said third and fourth deflection plates for establishing a field that permits passage of the particle beam therepast and undeflected thereby, and means connected in circuit with one of said third or fourth deflection plates for changing the potential on said one deflection plate to change the field between said third and fourth deflection plates for deflecting the particle beam from said particle path through said aperture in said collecting electrode to a position on said collector whereby any desired portion of each pulse of said particle beam can be passed into said accelerating tube by first effecting said initial deflecting means to cause the beam pulse to move from incidence on said collector electrode to the particle path so as to pass through said collector aperture and then after the desired portion of the pulse has passed through the aperture effecting said final deflecting means to cause the beam pulse again to move for incidence on said collector electrode.

6. The pulsing apparatus of claim 5 characterized further in that said means providing potential to said third and fourth deflection plates includes means for charging said third and said fourth plates to a positive potential, and said means connected in circuit with one of said third or fourth deflection plates includes means for rapidly reducing the potential on one of said third or fourth deflection plates to ground.

7. The pulsing apparatus of claim 5 characterized further in that said means providing potential to said third and fourth deflection plates includes means connecting one of said third or fourth plates to ground and means for charging the others of said third or fourth plates to a positive potential, means for establishing a magnetic field in the region between said third and fourth plates counterbalancing the effect on the charged particles by the electric field between the positive and the grounded plates and said means connected in circuit with one of said third or fourth deflection plates includes means for rapidly reducing the potential on said positive plate to ground.

8. The pulsing apparatus of claim 5 including means defining a cavity resonator between said anode and said accelerating tube means and having means permitting passage of charged particles therethrough, said cavity resonator having an apertured collector electrode and dimensioned to resonate in a primary mode having oscillating magnetic field directed transversely of the particle beam path therethrough for deflecting the particle beam to a position for passage of charged particles through the aperture in said collector electrode during only a portion of the operating cycle of the magnetic fields within the cavity resonator.

9. In a particle accelerator for accelerating particles to high energies;

a source of charged particles;

an anode electrode spaced from said source and having an aperture therethrough;

means for drawing a pulsed beam of charged particles from said source and focusing said pulsed beam through the aperture in said anode electrode;

accelerating tube means for accelerating charged particles and having an input end for receiving particles;

a collector electrode positioned at the input end of said accelerating tube means and between said accelerating tube means and said anode, said collector electrode having an aperture therein for passage of charged particles therethrough into said accelerating tube means; and a deflecting assembly for deflecting each pulse of said pulsed beam for passage of only a portion of said pulsed beam through said collecting electrode into said accelerating tube including a lens positioned between said anode electrode and said collecting electrode for focusing said pulsed beam to a small diameter at said collecting electrode, initial deflecting means including first and second deflection plates disposed between said anode electrode and said lens, said first and second deflection plates diverging in a direction toward said lens and located on opposite sides of the particle path from the aperture in said anode electrode to the aperture in said collecting electrode, means connecting said first deflection plate to ground potential, means for charging said second deflection plate to a positive potential for establishing a deflecting field between said plates for deflecting the initial particles of each pulse away from said particle path to a position on said collector electrode on one side of the aperture in said collector electrode, means connected in circuit with said second deflection plate for discharging the potential applied thereto to ground to remove the field between said plates for permitting a portion of the particles in each pulse of said pulsed beam to pass through the aperture in said collecting electrode into said accelerating tube means, final deflection means for deflecting particles at the end of each pulse from said particle path to a position on said collecting electrode side, said final deflecting means including third and fourth deflection plates diverging from the aperture in said collecting electrode toward said lens, located on opposite sides of said particle path, and rotated through an angle with respect to said first and second deflection plates equal to the angle of rotation imparted to the pulsed beam by said lens, means connected in circuit with said third deflection plate for charging said third deflection plate to a positive voltage, means connecting said fourth deflection plate to ground, means for establishing a magnetic field in the region between said third and fourth plates opposed to the electric field established therebetween when positive potential is applied to said third deflection plate, and means connected in circuit with said third deflection plate for discharging potential applied thereto for changing the electric field between said third and fourth deflection plates for deflecting the particle beam from said particle path through said aperture in said collecting electrode to a position ond said collector.

10. In a particle accelerator for accelerating particles to high energies:

a source of charged particles;

an anode electrode spaced for said source and having an aperture therethrough;
means for drawing a pulsed beam of charged particles from said source and focusing said pulsed beam through the aperture in said anode electrode;
a first collecting electrode spaced from said anode and having an aperture therein for passage of charged particles therethrough.
means defining a cavity resonator between said anode and said first collecting electrode dimensioned to resonate in a primary mode having oscillating magnetic fields directed transversely of the particle beam path between the apertures in said anode and said first collecting electrode for deflecting said pulsed beam to a position for passage of charged particles through the aperture in said first collecting electrode during only a portion of the operating cycle of the magnetic fields within said cavity resonator;
accelerating tube means for accelerating charged particles and having an input end for receiving particles;
a second collecting electrode positioned at the input end of said accelerating tube means and between said accelerating tube means and said anode, said second collecting electrode having an aperture therein for passage of charged particles therethrough into said accelerating tube means and a groove with tapered sides extending from opposing sides of said aperture and facing said first collector electrode; and
a deflecting assembly for deflecting each pulse of said pulsed beam for passage of only a portion of said pulsed beam through said second collecting electrode into said accelerating tube means including
  a lens positioned between said first collecting electrode and said second collecting electrode for focusing said pulsed beam to a small diameter at said second collecting electrode,
  initial deflecting means including first and second deflection plates disposed between said first collecting electrode and said lens, said first and second deflection plates diverging from the aperture in said first collecting electrode toward said lens and located on opposite sides of the particle path from the aperture in said first collecting electrode to the aperture in said second collecting electrode,
  means connecting said first deflection plate to ground potential,
  means for charging said second deflection plate to a positive potential for establishing a deflecting field between said plates for deflecting the initial particles of each pulse away from said path to a position in said groove in said second collecting electrode on one side of the aperture in said second collecting electrode,
  means connected in circuit with said second deflection plate for discharging the potential applied thereto to ground to remove the field between said plates for permitting a portion of the particles in each pulse of said pulsed beam to pass through the aperture in said second collecting electrode into said accelerating tube means,
  final deflection means for deflecting particles at the end of each pulse from said path to a position in said collecting electrode groove on the opposite side of the aperture in said collecting electrode from the initial deflected position produced by said initial deflecting means, said final deflecting means including third and fourth deflecting plates diverging from the aperture in said second collecting electrode toward said lens, located on opposite sides of said particle path, and rotated through an angle with respect to said first and second deflection plates equal to the angle of rotation imparted to the pulsed beam by said lens,
  means connected in circuit with said third deflection plate for charging said third deflection plate to a positive voltage, means connecting said fourth deflection plate to ground, means for establishing a magnetic field in the region between said third and fourth plates counterbalancing the electric field established therebetween when positive potential is applied to said third deflection plate, and
  means connected in circuit with said third deflection plate for discharging potential applied thereto for deflecting the particle beam from said particle path through said aperture in said second collecting electrode to a position in said collecting electrode groove on the opposite side of said aperture from the initial deflected position produced by said first deflection means.

11. The particle accelerator in accordance with claim 10 characterized further in that said cavity resonator is rectangular and dimensioned for operation in the $TE_{102}$ mode.

12. The particle accelerator in accordance with claim 10 characterized further in that said cavity resontaor is circular and dimensioned for operation in the $TM_{110}$ mode.

13. In a particle accelerator for accelerating particles to high energies: a source of charged particles; an anode electrode spaced from said source and having an aperture therethrough; means for drawing a beam of charged particles from said source and focusing said beam through the aperture in said anode electrode; accelerating wave guide means for accelerating charged particles and having an input end for receiving particles; a collecting electrode positioned at the input end of said accelerating wave guide means and between said accelerating wave guide means and said anode; a deflecting assembly for deflecting said particle beam for passage of only a portion of said beam through said collecting electrode into said accelerating wave guide means; and a prebunching cavity resonator positioned between said deflecting assembly and said collecting electrode for bunching particles in the beam before passage through said collecting electrode into said accelerating wave guide, said prebunching cavity resonator having a wall on the side thereof adjacent said deflecting assembly provided with an elongate slot for passing substantially all of said particle beam as said particle beam is deflected by said deflecting assembly.

14. In a particle accelerator for accelerating particles to high energies: a source of charged particles; an anode electrode spaced from said source and having an aperture therethrough; means for drawing a beam of charged particles from said source and focusing said beam through the aperture in said anode electrode; accelerating wave guide means for accelerating charged particles and having an input end for receiving particles; a collecting electrode positioned at the input end of said accelerating wave guide means and between said accelerating wave guide means and said anode; a deflecting assembly for deflecting said particle beam for passage of only a portion of said beam through said collecting electrode into said accelerating wave guide means; and a prebunching cavity resonator positioned between said deflecting assembly and said collecting electrode for bunching particles in the beam before passage through said collecting electrode into said accelerating wave guide; said deflecting assembly including a lens positioned between said prebunching cavity resonator and said anode for focusing said beam to a small diameter at said collecting electrode, initial deflecting means including first and second deflection plates disposed between said andode and said lens, said first and second deflection plates diverging from the aperture in said anode toward said lens and located on opposite sides of the particle path from the aperture in said anode to the aperture in said collecting electrode, means for producing a potential difference between the plates of said first pair of plates to deflect particles away from said path to cause said particles to strike said collector at one side of the aperture therein; means for rapidly reducing the potential difference between the plates of said first pair of plates to cause said particles to follow said particle path and pass through the aperture in said collecting electrode, final deflecting means including third and fourth deflection plates converging from said lens toward said prebunching cavity resonator and said collecting electrode and rotated through an angle with respect to said first and second deflection plates equal to the angle of rotation imparted to the particle beam by said lens, means for providing potential to said third and fourth deflection plates for establishing a field that permits passage of the particles therepassed and undeflected thereby and means for changing the field between said third and fourth deflection plates for deflecting particles from a position in which they pass through the aperture in said collecting electrode to a position where they strike said collecting electrode said prebunching cavity resonator having a wall on the side thereof adjacent said deflecting assembly and provided with an elongate slot for passing substantially all of said particle beam as said particle beam is deflected by said deflecting assembly.

References Cited

UNITED STATES PATENTS

| | | | |
|---|---|---|---|
| 2,081,942 | 6/1947 | Lubcke | 313—78 |
| 3,164,718 | 1/1965 | King | 328—229 |

JAMES W. LAWRENCE, *Primary Examiner.*

V. LAFRANCHI, *Assistant Examiner.*